United States Patent
Jamin et al.

(10) Patent No.: US 11,303,044 B2
(45) Date of Patent: Apr. 12, 2022

(54) INTERFERENCE MITIGATION APPARATUS AND METHOD FOR A WIRELESS TERMINAL

(71) Applicant: Cambium Networks Ltd, Ashburton (GB)

(72) Inventors: Antony Jamin, Ashburton (GB); Peter Strong, Ashburton (GB); Nigel King, Ashburton (GB)

(73) Assignee: CAMBIUM NETWORKS LTD, Ashburton (GB)

( * ) Notice: Subject to any disclaimer, the term of this patent is extended or adjusted under 35 U.S.C. 154(b) by 0 days.

(21) Appl. No.: 17/004,872

(22) Filed: Aug. 27, 2020

(65) Prior Publication Data
US 2020/0395686 A1 Dec. 17, 2020

Related U.S. Application Data

(63) Continuation of application No. PCT/GB2019/050556, filed on Feb. 28, 2019.

(30) Foreign Application Priority Data

Feb. 28, 2018 (GB) ..................................... 1803295

(51) Int. Cl.
*H01Q 25/00* (2006.01)
*H01Q 5/28* (2015.01)
(Continued)

(52) U.S. Cl.
CPC ......... *H01Q 25/002* (2013.01); *H01Q 3/2611* (2013.01); *H01Q 3/2652* (2013.01); *H01Q 5/28* (2015.01); *H04B 1/126* (2013.01)

(58) Field of Classification Search
CPC ........ H04B 1/126; H04B 1/10; H04B 1/1009; H04B 1/1039; H01Q 25/002; H01Q 5/28;
(Continued)

(56) References Cited

U.S. PATENT DOCUMENTS

| 3,438,041 A * | 4/1969 | Holtum, Jr. .......... H01Q 19/193 343/779 |
| 4,673,943 A * | 6/1987 | Hannan ................ H01Q 19/195 342/15 |

(Continued)

FOREIGN PATENT DOCUMENTS

| GB | 2240695 A | 8/1991 |
| GB | 2571709 A | 9/2019 |
| WO | WO 2019/166810 A1 | 9/2019 |

OTHER PUBLICATIONS

International Search Report and Written Opinion from corresponding PCT/GB2019/050556 dated Jun. 3, 2019 (14 pages).

(Continued)

*Primary Examiner* — Andrea Lindgren Baltzell
*Assistant Examiner* — Yonchan J Kim
(74) *Attorney, Agent, or Firm* — Crowell & Moring LLP

(57) ABSTRACT

A main antenna arrangement is configured to receive with a pre-configured first directional radiation pattern having a first beam with a first beamwidth and to provide first received signals at a first output, and at least one auxiliary antenna is configured to receive with a pre-configured respective second directional radiation pattern having a second beam with a second beamwidth, different from the first beamwidth and to provide second received signals at a second output. Interference cancelling circuitry is configured to control the amplitude and phase of the second received signals received from the at least one auxiliary antenna to produce weighted second received signals and combine the weighted second received signals with the first signals received from the main antenna arrangement to reduce a level of interference signals received by the main antenna arrangement in relation to a level of wanted signals received in the main antenna arrangement.

14 Claims, 16 Drawing Sheets

(51) Int. Cl.
*H01Q 3/26* (2006.01)
*H04B 1/12* (2006.01)

(58) Field of Classification Search
CPC ... H01Q 3/2611; H01Q 3/2635; H01Q 3/2652
See application file for complete search history.

(56) References Cited

U.S. PATENT DOCUMENTS

| | | | | |
|---|---|---|---|---|
| 4,989,262 | A * | 1/1991 | Saito | H04B 1/10 |
| | | | | 375/349 |
| 5,818,517 | A | 10/1998 | Hudson et al. | |
| 8,024,003 | B2 * | 9/2011 | Cezanne | H01Q 7/00 |
| | | | | 455/562.1 |
| 2002/0002065 | A1 | 1/2002 | Mesecher et al. | |
| 2003/0224751 | A1 * | 12/2003 | Vanderhelm | H04B 1/126 |
| | | | | 455/296 |
| 2006/0003808 | A1 * | 1/2006 | Haskell | H01Q 3/30 |
| | | | | 455/562.1 |
| 2010/0127949 | A1 * | 5/2010 | Shimizu | H01Q 21/26 |
| | | | | 343/810 |
| 2015/0123843 | A1 | 5/2015 | Lier et al. | |
| 2015/0346345 | A1 * | 12/2015 | Bartone | H01Q 3/2617 |
| | | | | 342/357.59 |
| 2016/0380355 | A1 * | 12/2016 | Lysejko | G01S 3/043 |
| | | | | 343/853 |
| 2017/0033819 | A1 | 2/2017 | Shaked et al. | |

OTHER PUBLICATIONS

Search Report issued in corresponding GB 1803295.3 dated Aug. 24, 2018 (2 pages).
Combined Search and Examination Report issued in corresponding GB 1803295.3 dated Aug. 28, 2018 (3 pages).

* cited by examiner

INTERFERENCE MITIGATION APPARATUS AND METHOD FOR A WIRELESS TERMINAL

CROSS-REFERENCE TO RELATED APPLICATIONS

This application is a continuation of International Patent Application No. PCT/GB2019/050556, filed Feb. 28, 2019, designating the United States and published in English as WO 2019/166810 A1 on Sep. 6, 2019, which claims priority from GB Application No. 1803295.3, filed on Feb. 28, 2018, the entirety of each of which are both hereby fully incorporated by reference

TECHNICAL FIELD

The present invention relates generally to interference mitigation for a wireless terminal in a wireless communications system, and more specifically, but not exclusively, to interference cancellation at a subscriber terminal of a point to multipoint fixed wireless access communications system that provides cancellation of interference received in an antenna for receiving signals sent from a wireless access point to the subscriber terminal.

BACKGROUND

In recent years, there has been an increasing need for wireless communications systems capable of carrying broadband data, and in particular for point-to-multipoint wireless communications networks in which a wireless access point, typically mounted on a tower, is in communication with several wireless subscriber terminal stations, which may receive signals from the wireless access point using an antenna typically mounted on the outside of customer premises.

Interference may be received in a licenced band, for example from other access points not intended to be communicating with a subscriber terminal. Furthermore, the use of unlicensed or shared frequency bands has exacerbated the problems relating to the constraints in the communications capacity of wireless broadband communications systems. An example of such a shared frequency band is the unlicensed frequency band located at 5 GHz. Similar problems may be encountered in other frequency bands. Due to the unlicensed nature of the shared 5 GHz band, more than one system operating in the 5 GHz band may be deployed within the same geographical area. Further, other types of wireless communications systems and radar operating in the 5 GHz band, or generating frequency harmonics having components in the 5 GHz band, may also be deployed within the same geographical area. As a result, the levels of noise and interference on the channels available to wireless communications systems are likely to increase, thereby significantly reducing data throughput and link availability. It is possible to mitigate the effects of interference by the use of adaptive modulation and error correction coding, but this may reduce data capacity and may not be effective against strong interferers. Null-steering beamforming techniques are known, using arrays of antenna elements each weighted in amplitude and phase, but such systems are typically complex and expensive.

It would be desirable to have an interference mitigation system that avoids the limitations of prior art systems.

SUMMARY

In accordance with a first aspect of the invention there is provided interference mitigation apparatus comprising:

a main antenna arrangement;
at least one auxiliary antenna, and
interference cancelling circuitry,
wherein the main antenna arrangement is configured to receive with a pre-configured first directional radiation pattern having a first beam with a first beamwidth and to provide first received signals at a first output, and
the at least one auxiliary antenna is configured to receive with a pre-configured respective second directional radiation pattern having a second beam with a second beamwidth, different from the first beamwidth and to provide second received signals at a second output,
wherein the interference cancelling circuitry is configured to control the amplitude and phase of the second received signals received from the at least one auxiliary antenna to produce weighted second received signals and combine the weighted second received signals with the first signals received from the main antenna arrangement to reduce a level of interference signals received by the main antenna arrangement in relation to a level of wanted signals received in the main antenna arrangement.

This allows interference to be cancelled in a low cost implementation. In particular, providing an auxiliary antenna having a different beamwidth from the main antenna arrangement allows a lower cost antenna to be used for the auxiliary than for the main antenna. The main antenna can a high performance antenna to give good gain for the wanted signal, whereas the auxiliary antenna can be a cheaper antenna with broader coverage.

In an embodiment of the invention, the first auxiliary antenna is disposed to receive radiation such that the second beam at least overlaps the first beam formed from the main antenna arrangement.

This facilitates cancellation of interference received in the beam of the main antenna assembly.

In an embodiment of the invention, a first auxiliary antenna is disposed to receive radiation as a beam having a different direction from the direction of the beam formed from the main antenna arrangement.

This allows a difference between the relative level of a wanted signal and an interference signal received by the auxiliary antenna and the relative level of the wanted signal and the interference signal received by the main antenna assembly, to facilitate interference cancellation without excessive reduction of the wanted signal.

In an embodiment of the invention, the interference mitigation apparatus comprises at least a second auxiliary antenna, the second auxiliary antenna being disposed to receive radiation as a beam having a different direction from the direction of the beam formed from the main antenna arrangement and having a different direction from the direction of the beam formed by the first auxiliary antenna.

This allows a diverse choice of relative levels of wanted signal and interference signal, to further facilitate interference cancellation.

In an embodiment of the invention, each auxiliary antenna is a patch antenna having a patch radiator disposed in a substantially parallel relationship with a ground plane.

This provides a convenient area of coverage, typically broader than that of the main antenna arrangement, and a compact and low cost implementation.

This provides a compact implementation of the main antenna assembly.

In an embodiment of the invention, the main antenna arrangement is a dish antenna comprising a feed antenna and a reflector dish; and the feed antenna is disposed to receive radio frequency radiation reflected from the reflector dish, such that the first beam having a first beamwidth is formed from the reflector.

This provides a high performance main antenna arrangement that may be produced as a standard item for use with or without interference mitigation.

In an embodiment of the invention, the at least one auxiliary antenna is disposed within the beam formed from the reflector.

This provides a compact implementation and may provide a substantially symmetrical arrangement to facilitate cancellation of interference from various directions of arrival.

In an embodiment of the invention, the feed antenna is attached to the reflector dish by a support assembly, and the at least one auxiliary antenna is attached to the support assembly.

This allows the at least one auxiliary antenna to be mounted substantially centrally within the beam from the reflector providing a compact installation and a symmetrical reception pattern.

In an embodiment of the invention, a reflector plate is attached to the support assembly between the feed antenna and the at least one auxiliary antenna.

The reflector plate provides a convenient site for the mounting of the auxiliary antenna, allowing at least one the auxiliary antenna to be approximately centrally mounted within the reflector dish while avoiding blocking the beam from the reflector dish.

In an embodiment of the invention, the main antenna arrangement is a flat plate antenna having an array of patch antenna elements and a feed network configured to combine the outputs of the patch antenna elements.

In an embodiment of the invention, the feed antenna is configured to receive radio frequency radiation at first and second orthogonal polarisations, and the at least one auxiliary antenna is configured to receive radio frequency radiation at third and fourth orthogonal polarisations, the first and second polarisations being different from the third and fourth polarisations.

This allows a difference between the relative level of a wanted signal and an interference signal received by the auxiliary antenna and the relative level of the wanted signal and the interference signal received by the main antenna assembly, to facilitate interference cancellation.

In an embodiment of the invention, the interference mitigation apparatus comprises a plurality of auxiliary antennas.

This allows diversity of interference reception levels to allow more effective cancellation without undue reduction of the wanted signal level.

In an embodiment of the invention, the plurality of auxiliary antennas are disposed to form respective beams in different directions from each other.

This may allow more effective cancellation by providing diversity in the levels of received interference signals between auxiliary antennas.

In an embodiment of the invention, each of the plurality of auxiliary antennas is configured to receive radio frequency radiation at respective orthogonal polarisations, wherein the received polarisations are different for each of the plurality of auxiliary antennas.

This may allow more effective cancellation of interference by providing diversity of interference level between auxiliary antennas, dependent on the polarization of the interference source.

In an embodiment of the invention, the plurality of auxiliary antennas are disposed radially about an axis between the centre of the reflector dish and the centre of the feed antenna.

This allows a compact implementation and provides even coverage for reception of interference.

In an embodiment of the invention, the interference cancelling circuitry comprises a selector switch configured to select at least one output from one of the plurality of auxiliary antennas to be weighted and combined with the signal received by the feed antenna.

This allows a low cost implementation by allowing a single weighting network to be used for a polarization state and allows a low complexity cancellation control circuit to be implemented.

In an embodiment of the invention, the selector switch is configured to select a first respective polarisation output from one of the plurality of auxiliary antennas and to select a second respective polarisation output from the same one or a different one of the plurality of auxiliary antennas, and wherein the interference cancelling circuitry comprises a vector modulator circuit configured to weight and combine the selected polarisation outputs to produce a first weighted and combined polarisation output for connection to respective polarisation inputs to a radio receiver, and the vector modulator may be configured to weight and combine the selected polarisation outputs to produce a second weighted and combined polarisation output for connected to a further polarisation input to the radio receiver.

This allows selection of an appropriate auxiliary antenna and polarization output for cancellation of interference at each polarisation of the main antenna arrangement.

In an embodiment of the invention, the vector modulator circuit has an analogue signal path and is disposed upon a support assembly attaching the feed antenna to the reflector dish.

This provides a low complexity and low cost implementation.

In an embodiment of the invention, the interference cancelling circuitry comprises a controller configured to successively apply settings of the selector switch and settings of the vector modulator, and to select settings which result in reduction of interference to an acceptable level.

This provides a low complexity controller to be used to implement the cancellation.

In an embodiment of the invention, the interference cancelling circuitry comprises a controller configured to control the vector modulator by a steepest descent perturbation algorithm to reduce a measure of interference.

This may allow faster adaptation than a search of each setting.

In accordance with a second aspect of the invention there is provided a method of mitigating interference received at a terminal in a wireless network comprising:

providing a main antenna arrangement, providing at least one auxiliary antenna, and providing interference cancelling circuitry;

configuring the main antenna arrangement to receive with a pre-configured first directional radiation pattern having a first beam with a first beamwidth and to provide first received signals at a first output;

configuring the at least one auxiliary antenna to receive with a pre-configured second directional radiation pattern having a second beam with a second beamwidth, different from the first beamwidth and to provide second received signals at a second output; and controlling the amplitude and phase of the second received signals received from the at least one auxiliary antenna to produce weighted second received signals and combining the weighted second received signals with the first signals received from the main antenna arrangement to reduce a level of interference signals received by the main antenna arrangement in relation to a level of wanted signals received in the main antenna arrangement.

In accordance with a third aspect of the invention there is provided interference mitigation apparatus comprising:
a feed antenna;
a reflector dish;
at least one auxiliary antenna, and
interference cancelling circuitry,
wherein the feed antenna is disposed to receive radio frequency radiation reflected from the reflector dish, such that a beam having a first beamwidth is formed from the reflector, and
the at least one auxiliary antenna has a directional radiation pattern having a second beamwidth, different from the first beamwidth, and is disposed to receive radiation from a direction away from the reflector dish as a beam at least overlapping the beam formed from the reflector dish and feed antenna,
wherein the at least one auxiliary antenna is disposed within the beam formed from the reflector, and
wherein the interference cancelling circuitry is configured to weight in amplitude and phase a signal received from the at least one auxiliary antenna and combine the weighted signal with a signal received from the feed antenna.

This provides a compact implementation and may provide a substantially symmetrical arrangement to facilitate cancellation of interference from various directions of arrival.

In an embodiment of the invention, the at least one auxiliary antenna is a patch antenna having a patch radiator disposed in a substantially parallel relationship with a ground plane.

This allows a compact installation.

In an embodiment of the invention, the feed antenna is attached to the reflector dish by a support assembly, and the at least one auxiliary antenna is attached to the support assembly.

This allows the at least one auxiliary antenna to be mounted substantially centrally within the beam from the reflector providing a compact installation and a symmetrical reception pattern.

In an embodiment of the invention, a reflector plate is attached to the support assembly between the feed antenna and the at least one auxiliary antenna.

The reflector plate provides a convenient site for the mounting of the auxiliary antenna, allowing at least one the auxiliary antenna to be approximately centrally mounted within the reflector dish while avoiding blocking the beam from the reflector dish.

Further features of the invention will be apparent from the following description of preferred embodiments of the invention, which are given by way of example only.

DETAILED DESCRIPTION

By way of example, embodiments of the invention will now be described in the context of a point-to-multipoint fixed wireless access system operating according to an IEEE 802.11 standard, operating as a time division duplex and time division multiplex system at carrier frequencies typically between 3 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands. The operating frequencies may typically be microwave frequencies, from approximately 300 MHz to 30 GHz. Preferred operating frequencies may be in the range 1 GHz-10 GHz, and embodiments of the invention may operate at various licensed and unlicensed frequency bands including 2.4 GHz and various frequency bands from 5.2 GHz to 5.8 GHz, for example.

Embodiments of the invention will be described in the context of interference mitigation at a subscriber terminal, which may also be referred to as a subscriber module, which may be typically mounted on the outside of a customer's premises, for example on an outside wall. The subscriber terminal has a directional antenna, which is installed to receive and transmit signals for communication with a wireless access point, which is typically mounted on a tower and is in communication with many other subscriber terminals. There may also be other access points in other locations, and the interference may be received from these other access points in some conditions. Also, interference may be received from other users of the band, in particular in the case of the use of an unlicensed band. The directional antenna of the subscriber terminal, which is typically a dish antenna, but may also be a flat plate antenna, typically gives some rejection of interference, by virtue of its directional antenna which is arranged to form a beam to (and from) the access point. In a Time Division Duplex (TDD) system, the same frequency is used for transmit and receive, so that the antenna characteristics such as directivity and beamwidth are typically the same for transmit and receive. However, there may be cases where interference is receive at a sufficiently high level to cause degradation of the wanted signal which is received from the access point. The source of interference may, for example, be offset from the centre of the main beam, but may be still in a part of the reception pattern that has sufficient gain to allow the interfering signal to cause troublesome interference.

Figure 1:
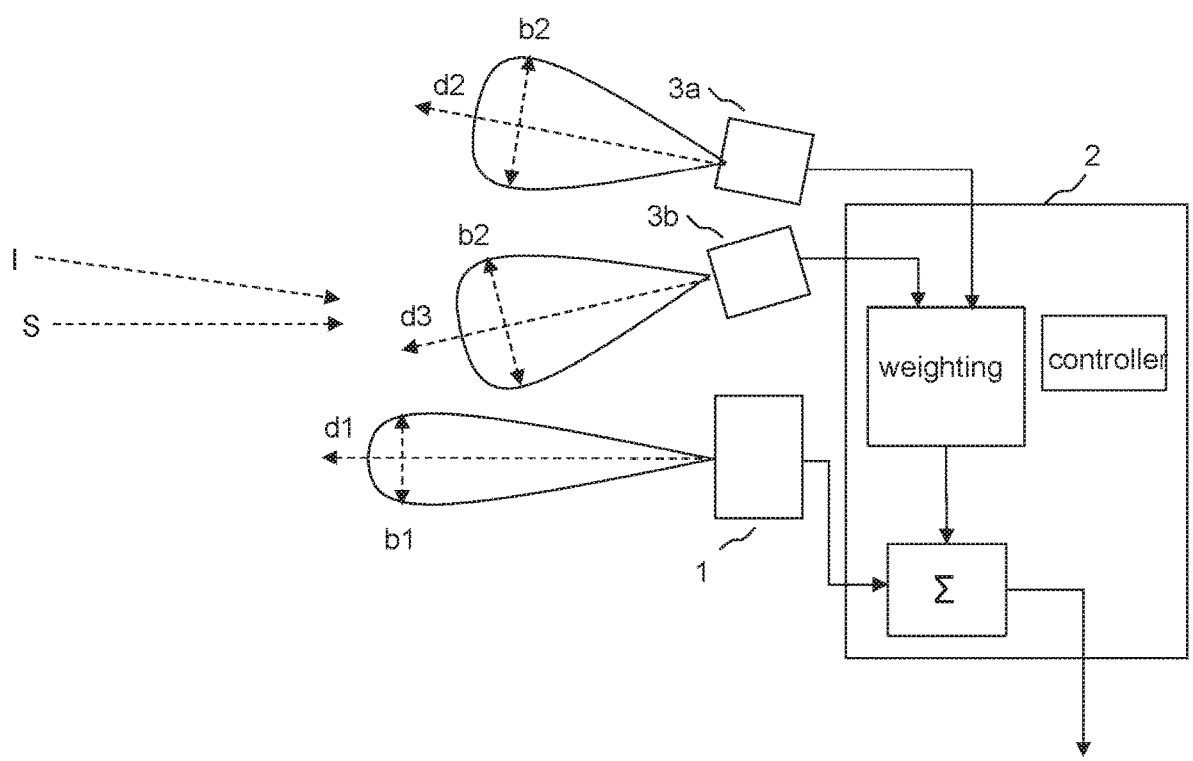
FIG. 1 shows an embodiment of the invention in which an interference signal and a wanted signal are received at a subscriber terminal by a main antenna and two auxiliary antennas, the two auxiliary antennas having different beamwidths and different beam directions from the receive beam of the main antenna.

FIG. 1 shows an interference mitigation system in an embodiment of the invention, in which at least one auxiliary antenna 3a, 3b, typically a patch antenna, is provided in addition to the main antenna 1, which is typically a dish antenna or flat plate antenna having a pre-configured beam pattern. An interference signal I and a wanted signal S are received by a main antenna and, in this example, by the two auxiliary antennas. The output from at least one auxiliary antenna is adjusted in amplitude and phase to cancel the interference signal when combined with the output of the main antenna, under control by a controller in an interference cancelling circuit 2. If there is more than one auxiliary antenna, an output of one of the auxiliary antennas may be selected for amplitude and phase weighting by the controller, using a selection switch. As shown in FIG. 1, the two auxiliary antennas have different beamwidths b2 from the beamwidth b1 of the beam of the main antenna, and may have different beam directions d2, d3 from each other and from the direction d1 of the beam of the main antenna. The difference between the beamwidths, and typically also the beam directions, of the auxiliary antennas and the main antenna may have the beneficial effect of causing the relative received powers, and phases, of the interference signals and wanted signals to differ between the main and auxiliary antennas, and if there is more than one auxiliary antenna, this gives diversity in the differences. This may improve cancellation of the interference without undue cancellation of the wanted signal. In a simple embodiment, the selection of auxiliary antenna, and the control of the amplitude and phase weight value, may be on the basis of a random search. A measure of interference level, for example measured in the known absence of the wanted signal within a predetermined part of a TDD transmit sequence, can be used to select the best auxiliary antenna and weight value. Alternatively or in addition, a measure of wanted signal quality such as signal to noise ratio, vector error or packet error rate can be used for the selection.

In the case of the main antenna being a dish antenna, the one or more auxiliary antennas may be mounted on a feed structure of the dish antenna. The interference cancelling circuitry may be also mounted on the feed structure. The signal path through the interference cancelling circuitry may be at radio frequency using analogue components, allowing a simple and cheap implementation. The feed structure may be referred to as a feed assembly. The feed assembly may include an enclosure giving environmental protect to the feed antenna. The auxiliary antennas may be mounted to the feed assembly via the enclosure.

Returning to FIG. 1, this shows interference mitigation apparatus comprising a main antenna arrangement 1, typically a dish antenna assembly or a flat plate antenna assembly, at least one auxiliary antenna 3a, 3b, typically a patch antenna, and interference cancelling circuitry 2. The main antenna arrangement is configured to receive radiation, typically from an access point, with a pre-configured first directional radiation pattern having a first beam with a first beamwidth b1 and to provide first received signals at a first output. The beamwidth is the angle between half-power points of the beam, that is to say the −3 dB points. The first output is typically for reception, and potentially also for transmission, of signals at a given polarisation. The pre-configured radiation pattern is determined by the physical arrangement of a reflector dish and a feed antenna in the case of a dish antenna, and typically by a printed feed network combining an array of patch antenna elements to give a single output for each polarization state, in the case of a flat plate antenna.

The at least one auxiliary antenna 3a, 3b is configured to receive with a pre-configured second directional radiation pattern having a second beam with a second beamwidth b2, different from the first beamwidth and to provide second received signals at a second output, and may be disposed to receive radiation such that the second beam at least overlaps the first beam formed from the main antenna arrangement. The overlap may be between the regions of each respective beam within the half-power points of the respective beam. The overlap facilitates cancellation of interference signals received in the main beam of the main antenna. For example, the second beamwidth may be more than 50% greater than the first beamwidth. In another example the second beamwidth may be more than twice the first beamwidth.

The interference cancelling circuitry 2 is configured to control the amplitude and phase of the second received signals received from the at least one auxiliary antenna to produce weighted second received signals and combine the weighted second received signals with the first signals received from the main antenna arrangement to reduce a level of interference signals received by the main antenna arrangement in relation to a level of wanted signals received in the main antenna arrangement.

This allows interference to be cancelled in a low cost implementation. In particular, providing an auxiliary antenna having a different beamwidth from the main antenna arrangement allows a lower cost antenna to be used for the auxiliary than for the main antenna. The main antenna can a high performance antenna to give good gain for the wanted signal, whereas the auxiliary antenna can be a cheaper antenna with broader coverage. For example, the auxiliary antenna may have a beamwidth in azimuth of greater than 60 degrees, and may be greater than 80 degrees, in one example 84 degrees. The main antenna may have a beamwidth of less than 30 degrees, and may be less than 20 degrees, in one example 14 degrees.

As shown in FIG. 1, a first auxiliary antenna 3a is disposed to receive radiation as a beam having a different direction d2 from the direction d1 of the beam formed from the main antenna arrangement. For example, the direction d2 may be more than 20 degrees different from the direction d2. In another example, the direction d2 may be more than 30 degrees different from the direction d1. This allows a difference between the relative level of a wanted signal and an interference signal received by the auxiliary antenna and the relative level of the wanted signal and the interference signal received by the main antenna assembly, to facilitate interference cancellation without excessive reduction of the wanted signal.

As shown in FIG. 1, the interference mitigation apparatus may comprises at least a second auxiliary antenna 3b, the second auxiliary antenna 3b being disposed to receive radiation as a beam having a different direction d3 from the direction d1 of the beam formed from the main antenna arrangement and having a different direction from the direction d2 of the beam formed by the first auxiliary antenna. This allows a diverse choice of relative levels of wanted signal and interference signal, to further facilitate interference cancellation. Typically, as shown in FIG. 1, each auxiliary antenna has a similar beamwidth b2, so that each auxiliary antenna may be a similar low cost patch antenna. The patch antennas typically have a patch radiator, which may conventionally be a square of copper approximately half a wavelength wide, on a layer of a printed circuit board disposed in a substantially parallel relationship with a ground plane, which may be a copper layer on the other side of the printed circuit board. A patch antenna provides a convenient area of coverage, which may for example be 80 degrees or so in azimuth, that is typically broader than that of the main antenna arrangement. Patch antennas are also inherently compact and typically low cost.

Figure 2:
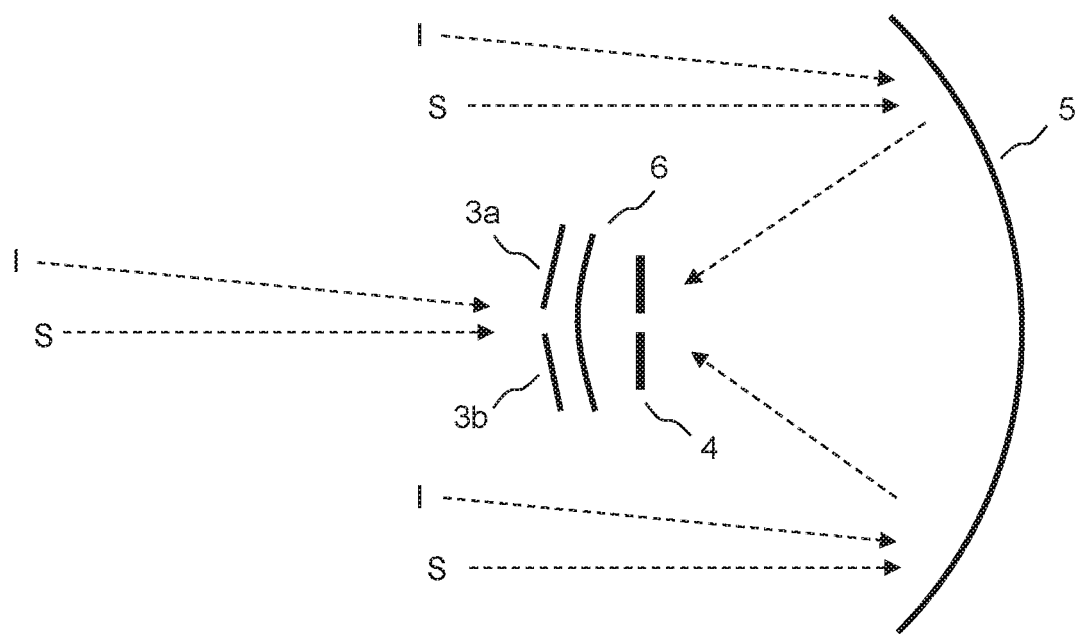
FIG. 2 shows an embodiment of the invention in which the main antenna is a dish antenna comprising a reflector dish and a feed antenna and the auxiliary antennas are mounted behind a reflector plate behind a feed antenna.

FIGS. 2 to 8 show embodiments of the invention in which the main antenna arrangement is a dish antenna. The dish antenna comprises a feed antenna 4 and a reflector dish 5. The feed antenna is disposed to receive radio frequency radiation reflected from the reflector dish, such that a first beam having a first beamwidth is formed from the reflector. This provides a high performance main antenna arrangement that may be produced as a standard item for use with or without interference mitigation. As shown in FIG. 2, in an embodiment of the invention, at least one auxiliary antenna 3a, 3b is disposed within the beam formed from the reflector 5. The beam formed from the reflector typically is collimated, and is directed towards the incoming signal S shown in FIG. 2, past the feed structure which includes the feed antenna 4, in this case a dipole, and a reflector 6. The auxiliary antennas are typically mounted as shown, mounted on the end of the feed structure away from the reflector dish. This allows the auxiliary antennas to be mounted without interfering with the beam from the main antenna arrangement, while being within the main beam, in the sense of being surrounded by the main beam, which allows a compact implementation.

Figure 3:
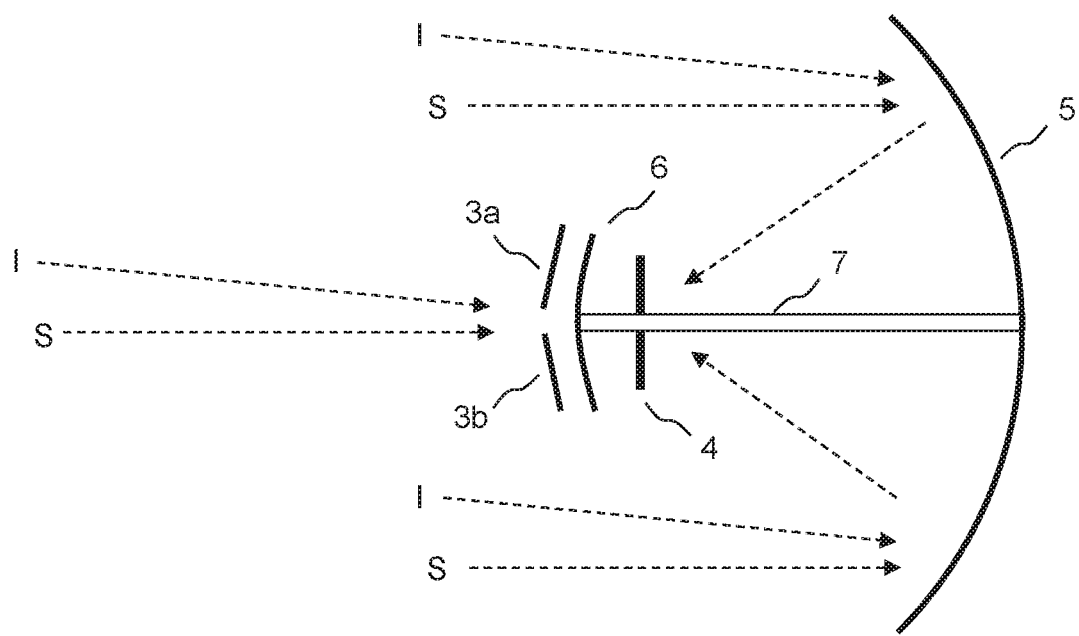
FIG. 3 shows an embodiment of the invention in which the feed antenna is attached to the reflector dish by a support assembly.

As shown in FIG. 3, the feed antenna 4 is attached to the reflector dish 5 by a support assembly 7, which may comprise a printed circuit board, and the at least one auxiliary antenna is attached to the support assembly, potentially via an enclosure of the support assembly. As can be seen from FIG. 3, a reflector plate 6 is attached to the support assembly between the feed antenna and the at least one auxiliary antenna. The reflector plate 6 reflects radiation from the feed antenna 4 towards the reflector dish 5, to increase the efficiency of the antenna. The reflector plate provides a convenient site for the mounting of the auxiliary antenna, allowing at least one the auxiliary antenna to be approximately centrally mounted within the reflector dish while avoiding blocking the beam from the reflector dish.

Figure 4:
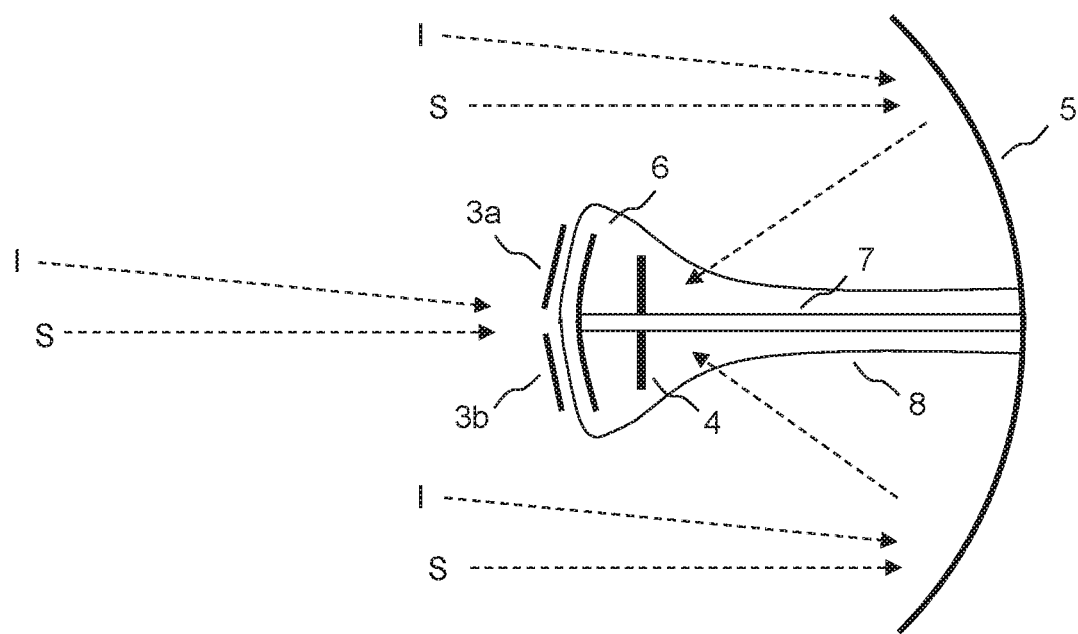
FIG. 4 shows an embodiment of the invention in which the feed assembly is protected by an enclosure and the auxiliary antennas are mounted on the end of the enclosure opposite the reflector dish.

FIG. 4 shows that the feed assembly may include a feed enclosure or cover 8, typically made of a non-conductive material, such as plastic, to allow the passage of radiation which can act as a convenient support for the auxiliary antennas 3a, 3b. The auxiliary antennas may themselves have a non-conductive cover for environmental protection, which may be part of the feed enclosure 8.

Figure 5:
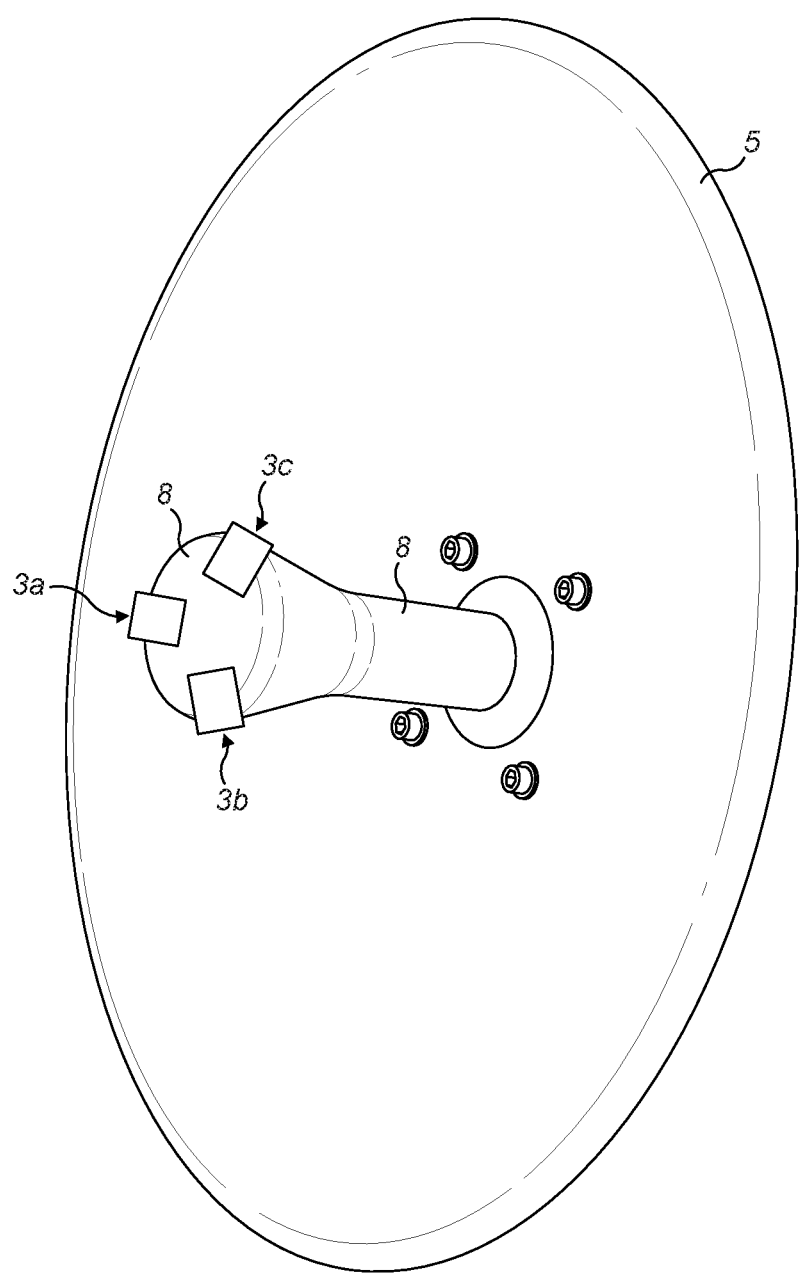
FIG. 5 shows and embodiment of the invention in an oblique view showing the auxiliary antennas mounted on the feed enclosure.

FIG. 5 shows an embodiment of the invention in an oblique view showing three auxiliary antennas 3a, 3b, 3c mounted on the feed enclosure 8. The auxiliary antennas are disposed radially about an axis between the centre of the reflector dish and the centre of the feed antenna.

Figure 6:
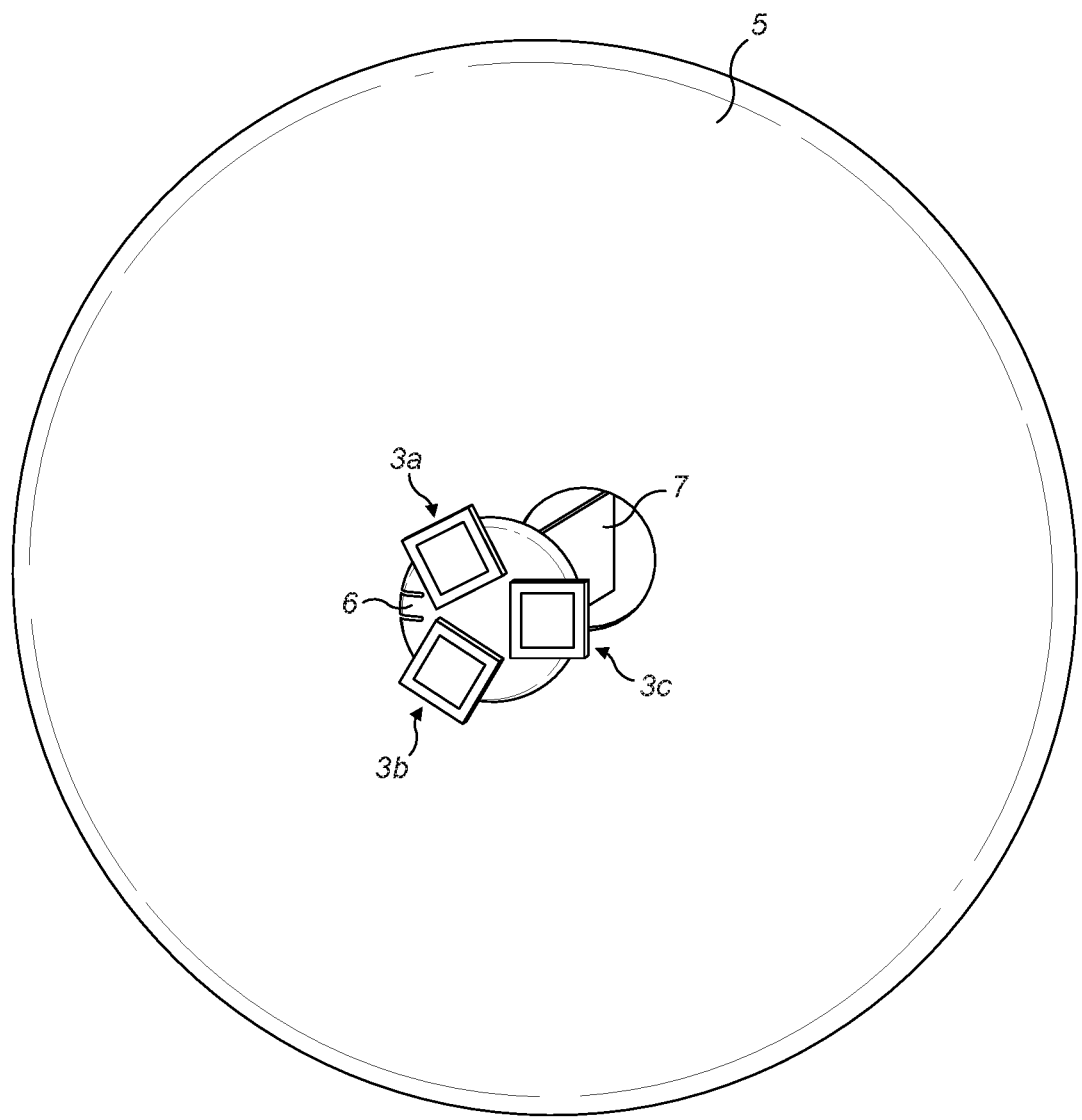
FIG. 6 shows the arrangement of FIG. 5 with the feed enclosure removed to show the internal components.

FIG. 6 shows the arrangement of FIG. 5 with the feed enclosure removed to show the support assembly 7, typically comprising printed circuit board, and the reflector plate 6.

Figure 7:
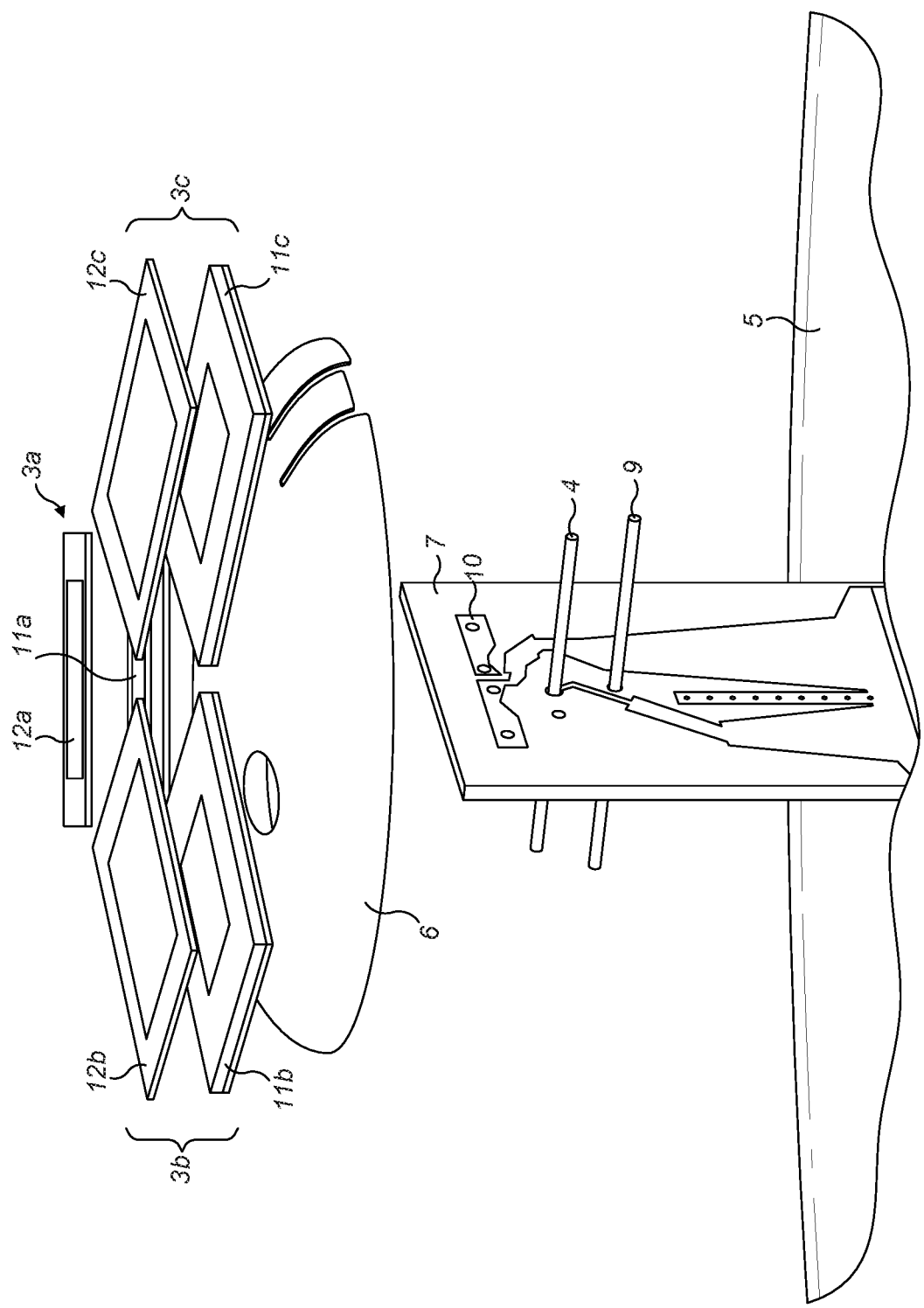
FIG. 7 shows an exploded view of the feed structure and the auxiliary antennas.

FIG. 7 shows the feed structure 7 and the auxiliary antennas 3a, 3b and 3c in more detail. The auxiliary antennas may comprise patch antenna elements 11a, 11b and 11c, and also director elements 12a, 12b, 12c, as is conventional. The feed structure 7 may have printed tracks as shown to connect the feed antenna 4, shown as a dipole, to an output of the dish antenna arrangement. Also shown is a second feed antenna 10, shown as a printed dipole, to feed the dish antenna at an orthogonal polarization from that of the first feed antenna 4. The element shown as 9 is a passive director to operate in conjunction with the first feed antenna 4 to improve the collection of radiofrequency radiation from the reflector dish 5.

Figure 8:
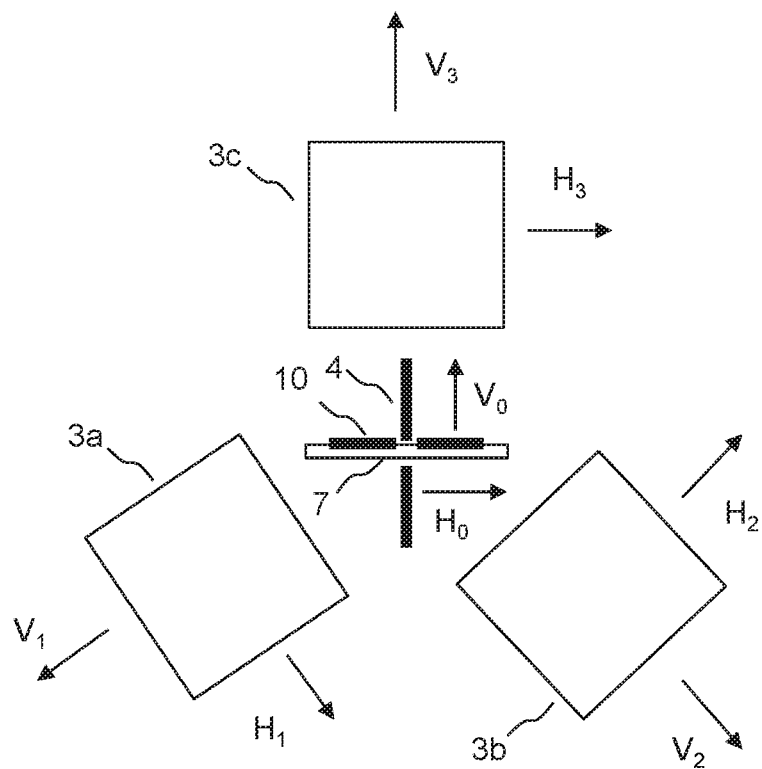
FIG. 8 shows an example of relative orientations of the polarizations of the auxiliary antennas and the two polarisations of the feed antenna in an embodiment of the invention.

FIG. 8 shows an example of relative orientations of the polarizations of the auxiliary antennas and the two polarisations of the feed antenna in an embodiment of the invention. This corresponds to the arrangement shown in the dish antenna of FIGS. 5 to 7. The three auxiliary antennas 3a, 3b, 3c which are mounted on the central feed structure of the dish antenna, are each rotated by approximately 120 degrees relative to their neighbour, so that the polarisations they receive are different by approximately 120 degrees for a corresponding output. So, taking the nominally "vertical" outputs $V_1$, $V_2$ and $V_3$, these each differ in orientation from each other, as do the nominally "horizontal" outputs $H_1$, $H_2$ and $H_3$. As can be seen from FIG. 8, the polarizations of at least two of the auxiliary antennas 3a and 3b differ from the polarisations $V_0$ and $H_0$ of the feed antennas 10 and 4. So, as can be seen, the feed antenna 4, 10 is configured to receive radio frequency radiation at first and second orthogonal polarisations, and the at least one auxiliary antenna is configured to receive radio frequency radiation at third and fourth orthogonal polarisations, the first and second polarisations being different from the third and fourth polarisations. As shown in FIG. 8, each auxiliary antenna 3a, 3b, 3c is configured to receive radio frequency radiation at respective orthogonal polarisations, wherein the received polarisations are different for each of the plurality of auxiliary antennas. This may allow more effective cancellation of interference by providing diversity of interference level between auxiliary antennas, dependent on the polarization of the interference source. A vector modulator may combine and weight in amplitude and phase signals received at different polarizations on one or more auxiliary antennas in order cancel signals received at a given polarisation on the main antenna assembly, as shown for example in the arrangement in FIG. 13.

Figure 9:
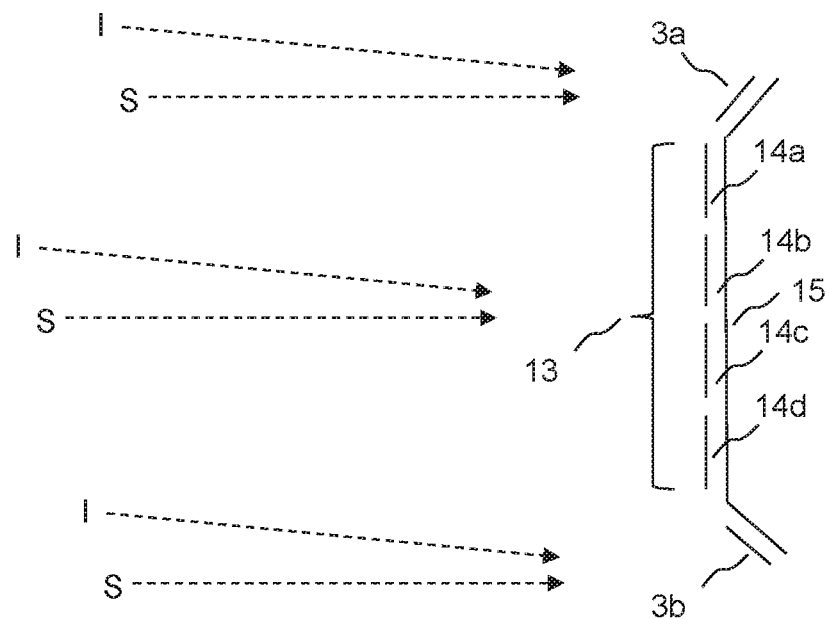
FIG. 9 shows an embodiment of the invention in which the main antenna is a flat plate antenna and the auxiliary antennas are mounted at an angle to the base plate of the plat plate antenna.

FIG. 9 shows an embodiment of the invention in which the main antenna arrangement comprises a flat plate antenna 13 having an array of patch antenna elements 14a, 14b, 14c, 14d. A feed network, typically comprising a network of printed tracks and combiners, may be configured to combine the outputs of the patch antenna elements to provide an respective output for a signals received at orthogonal polarisations. As shown in FIG. 9, the auxiliary antennas 3a, 3b may be mounted at an angle to the base plate 15 of the flat plate antenna.

Figure 10:
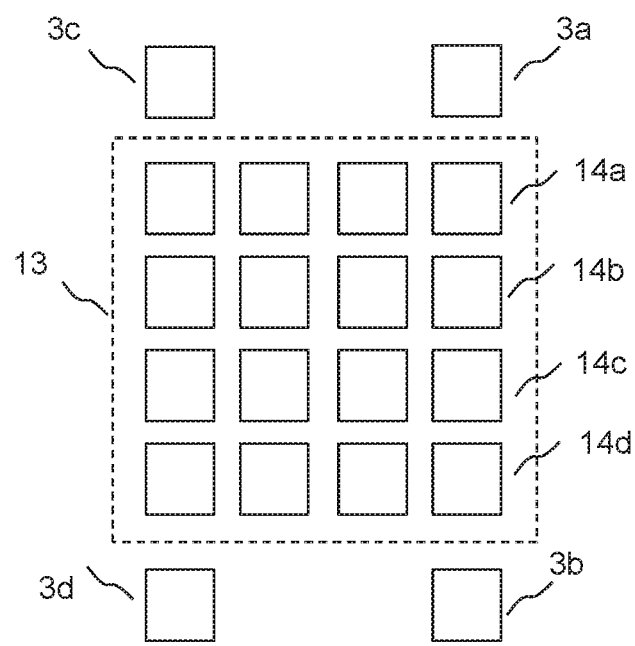
FIG. 10 is a top view of a flat plate antenna and auxiliary antennas in an embodiment of the invention.
Figure 11:
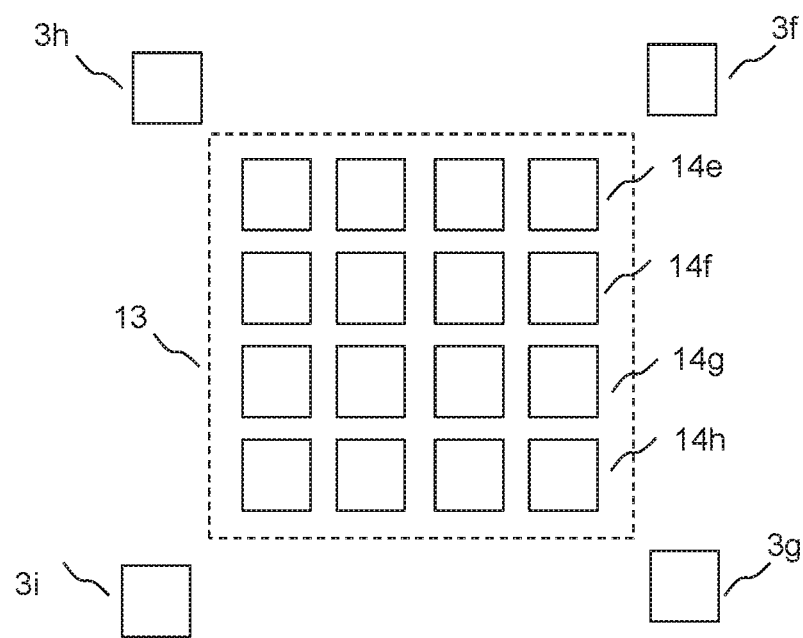
FIG. 11 is a top view of a flat plate antenna and auxiliary antennas in an alternative arrangement in an embodiment of the invention.
Figure 12:
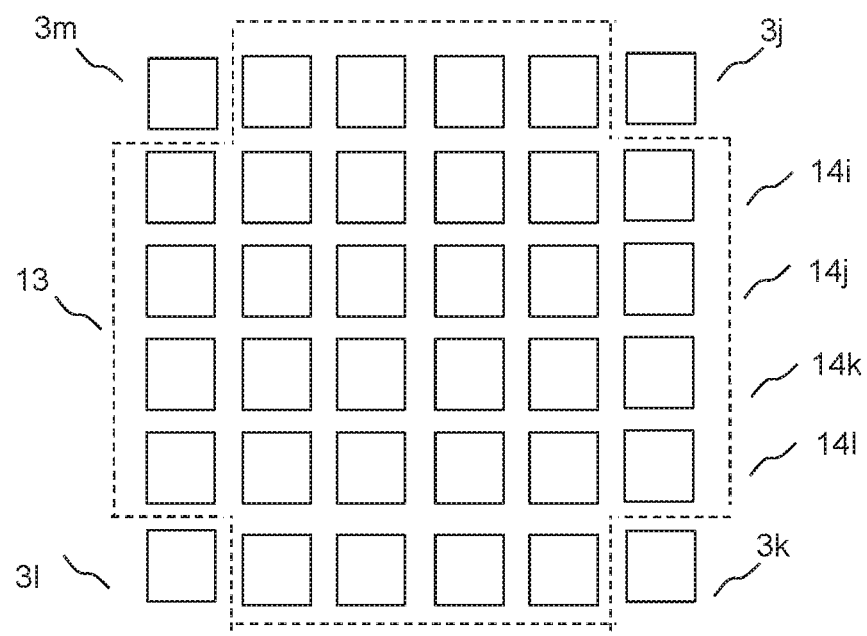
FIG. 12 is a top view of a flat plate antenna and auxiliary antennas in a further alternative arrangement in an embodiment of the invention.

FIGS. 10, 11 and 12 are top view of example arrangements for a flat plate antenna 13 showing patch antenna elements 14a . . . l of the flat plate antenna and auxiliary antennas 3a . . . 3m in embodiment of the invention. In each case, the auxiliary elements may be inclined with respect to the patch antenna elements of the flat plate antenna 13. Typically the auxiliary elements are arranged at the periphery of the flat plate antenna but the elements may be optionally interspersed with patch antenna elements, but not connected to the feed network for the flat plate antenna.

Figure 13:
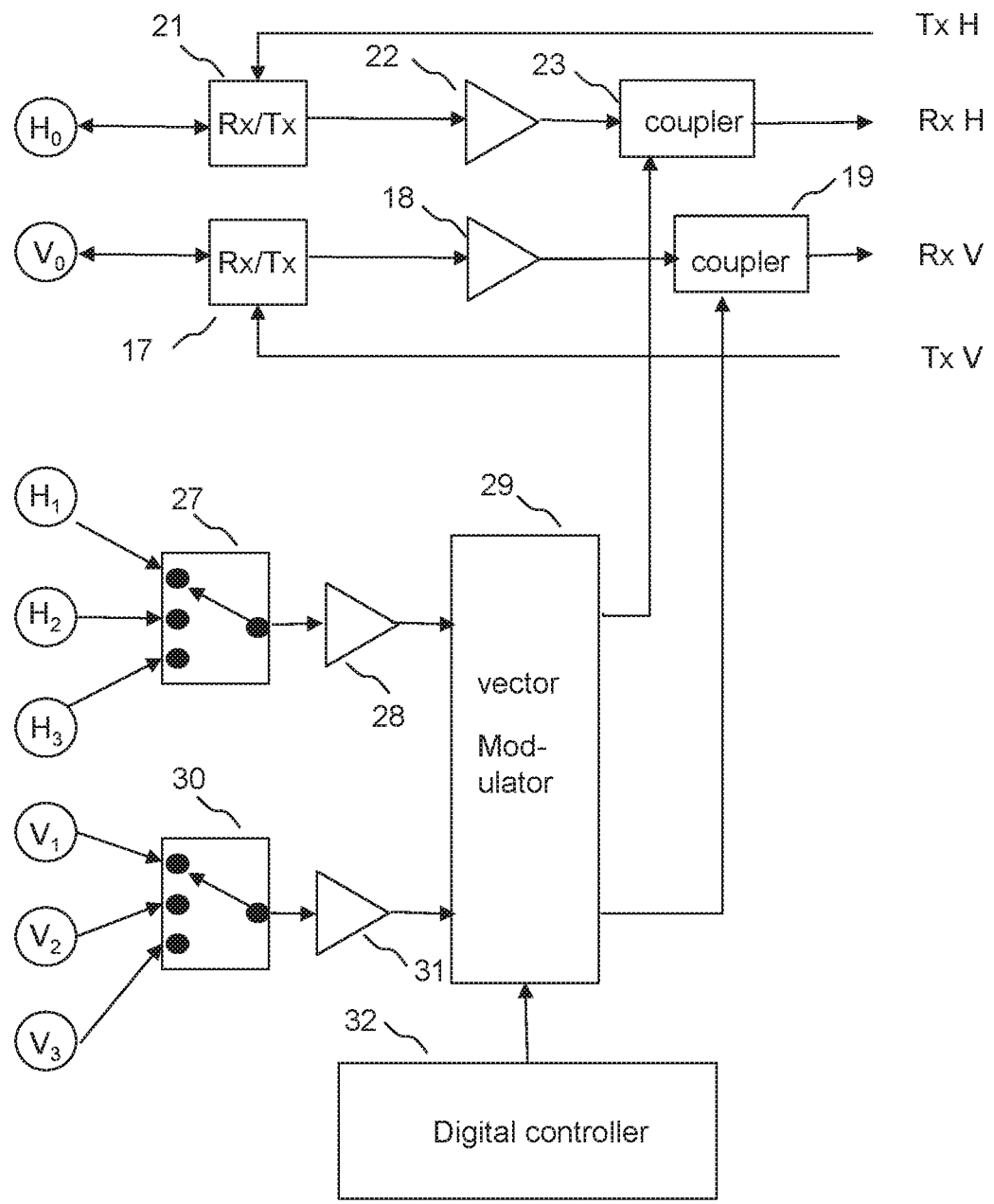
FIG. 13 shows interference cancelling circuitry comprising a selector switch and vector modulators in an embodiment of the invention.

FIG. 13 shows interference cancelling circuitry comprise a selector switch 27, 30 and a vector modulator 29 in an embodiment of the invention. As can be seen from FIG. 13, the selector switch 27, 30 is configured to select at least one output from one of the plurality of auxiliary antennas to be weighted and combined with the signal received by the feed antenna. The selector switch comprises a first selector switch part 27 configured to select a first respective polarisation output from one of the plurality of auxiliary antennas and a second selector switch part 30 to select a second respective polarisation output from the same one or a different one of the plurality of auxiliary antennas. The vector modulator 29 is a circuit configured to weight and combine the selected polarisation outputs, suitably amplified by low noise amplifiers 28, 31, to produce a first weighted and combined polarisation output and potentially also a second weighted and combined polarisation output for connection to respective polarisation inputs to a radio receiver. As shown in FIG. 13, the respective polarization outputs of the outputs from the vector modulator 29 are combined with the respective polarisation channels of the receiver for the main antenna arrangement. Respective transmit/receive switches 17, 21 are used to connect the transmitter or receiver of the subscriber terminal to the main antenna assembly in time with the TDD sequence. On the receive channels, a low noise amplifier 18, 22 is provided as is conventional in a receiver, and is followed by a respective coupler 19, 23 to combine the signal from the vector modulator with the respective signal received from the main antenna assembly.

Figure 14:
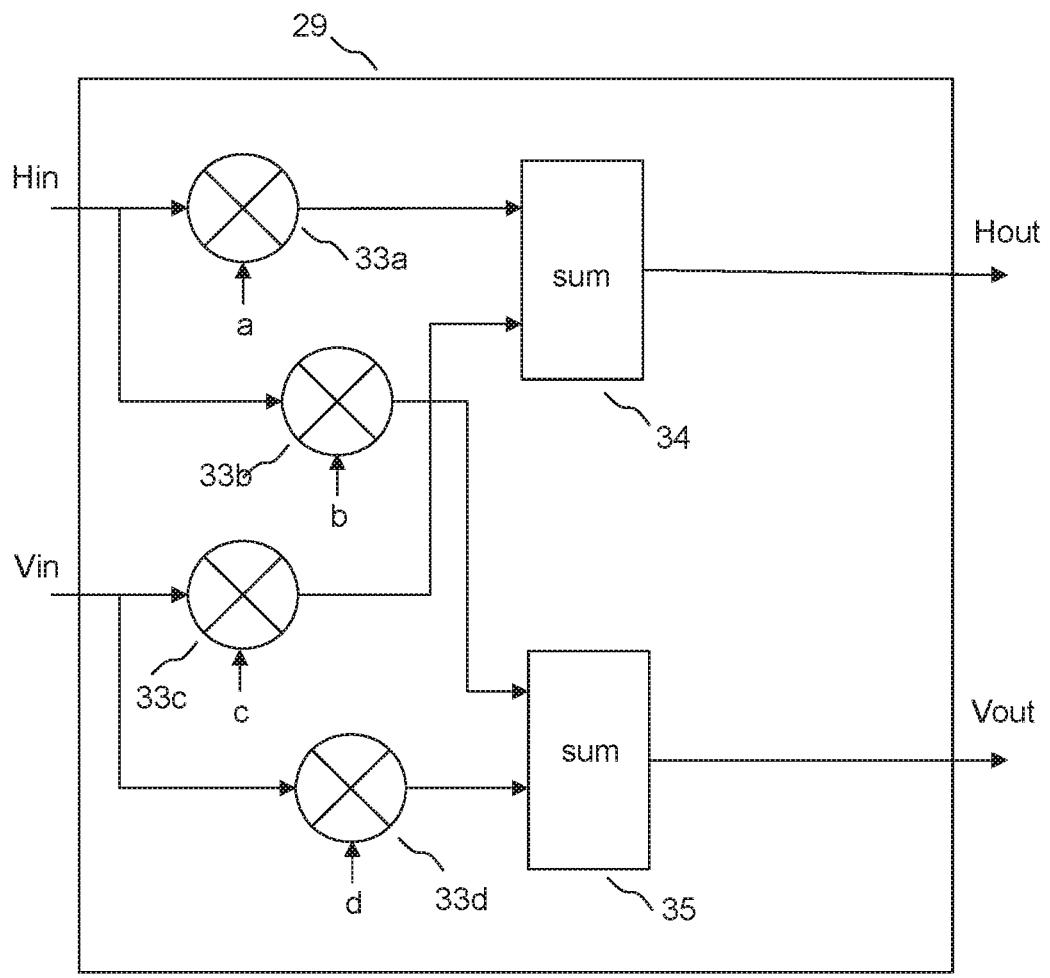
FIG. 14 shows the vector modulators of FIG. 13 in more detail.

FIG. 14 shows the vector modulator of FIG. 13 in more detail. Two inputs are provided, Hin and Vin, from the selected polarization outputs of the auxiliary antennas, as selected by the selector switch under control of the controller. Each input is split, and each part is separately weighted in amplitude and phase by respective weighting networks 33a, 33b, 33c, 33d. Separate weighted combinations of Hin and Vin, combined in summers 34, 35, are provided at outputs Vout and Hout, for coupling to the respective H and V channels of the receiver connected to the main antenna arrangement.

Figure 15:
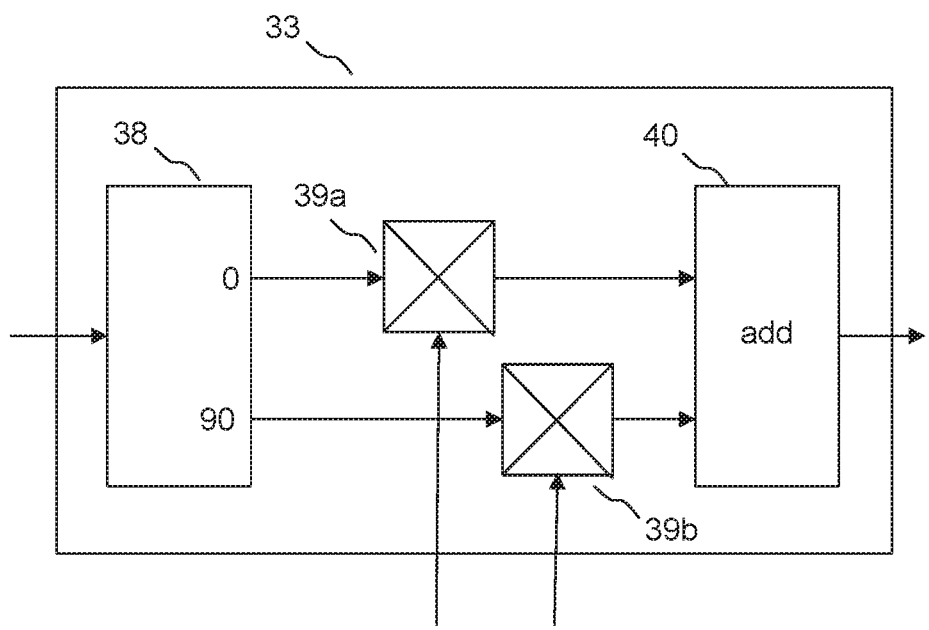
FIG. 15 shows an example of an implementation of part of a vector modulator.

FIG. 15 shows an example of an implementation of part of weighting element 33 as part of the vector modulator. As shown the weighting elements comprises a 90 degree splitter 38, two biphase modulators 39a, 39b, and a combiner 40.

Figure 16:
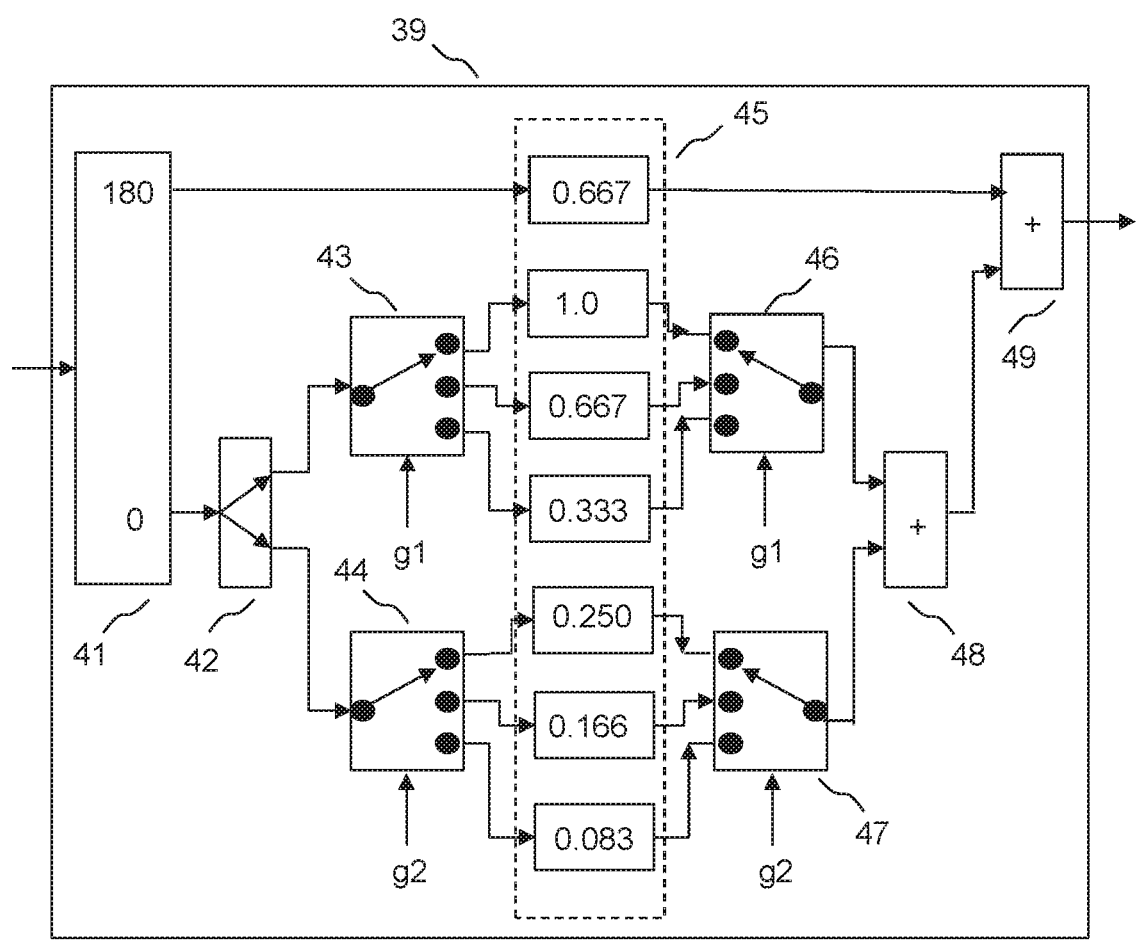
FIG. 16 shows an example of an implementation of a biphase modulator, as a component of a vector modulator, using selectable attenuation stages.

FIG. 16 shows an example of an implementation of a biphase modulator using selectable attenuation stages. An incoming signal is split in a splitter 41 into 0 and 180 degree parts, and one part, in this example the 180 degree part, is attenuated and fed to a summer 49, for combination with a suitably attenuated version of the other part which is in antiphase, in this example the 0 degree part. An arrangement of splitters 42 and switches 43, 44, 46, 47, fixed attenuators 45 and combiners 48 is used to select a path having an appropriate attenuation to give the desired amplitude and a 0 or 180 degree phase, depending on whether the 0 or 180 degree component has the higher magnitude when combined in antiphase. This provides a simple and low cost implementation of a biphase modulator.

In the embodiments shown in FIGS. 13 to 16, the vector modulator circuit has an analogue signal path at radio frequency, and this may provide a low cost and simple implementation. The vector modulator may be mounted on a support assembly attaching a feed antenna to the reflector dish, providing a convenient implementation.

The controller in the interference cancelling circuitry may be implemented in a variety of ways, for example by the use of a microcontroller comprising a processor configured at execute program code held in memory. The controller may also be implemented as a function performed in a digital processor which may carry out other functions in addition, for example a control processor for a subscriber terminal, or by processing in a remote processor or by cloud processing. The controller may be configured to successively apply settings of the selector switch and settings of the vector modulator, and to select settings which result in reduction of interference to an acceptable level. This may be a trial and error selection process. In particular in the case of a fixed wireless access installation, the differences between the amplitude and phase of the interference signal received from the main antenna and the amplitude and phase of the interference signal received at the auxiliary antenna or antennas may be only slowly varying, and may be typically static for extended periods. This may allow sufficient time for such a process to find an acceptable solution, for example on start-up of a subscriber terminal. If the level of interference becomes unacceptable, the search process may be restarted. This provides a low complexity controller to be used to implement the cancellation. Alternatively, the controller may be configured to control the vector modulator by a well-known steepest descent algorithm such as a perturbation algorithm, to reduce a measure of interference and/or to increase a measure of signal to noise ratio, which may allow faster adaptation than a search of each setting.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An interference mitigation apparatus comprising:
   a main antenna arrangement;
   a plurality of auxiliary antennas;
   a selector switch; and
   interference cancelling circuitry,
   wherein the main antenna arrangement is configured to
      receive with a pre-configured first directional radiation pattern having a first beam with a first beamwidth and to provide first received signals, each of the plurality of auxiliary antennas is configured to receive with a pre-configured respective second directional radiation pattern having a second beamwidth, different from the first beamwidth wherein each of the plurality of auxiliary antennas is disposed to form a respective beam pattern centred on a different direction from a centre of a beam pattern of each other of the plurality of auxiliary antennas, the selector switch is configured to select at least one output from at least one of the plurality of auxiliary antennas to provide second received signals, and the interference cancelling circuitry is configured to control an amplitude and a phase of the second received signals to produce weighted second received signals and combine the weighted second received signals with the first signals received from the main antenna arrangement to reduce a level of interference signals received by the main antenna arrangement in relation to a level of wanted signals received in the main antenna arrangement.

2. The interference mitigation apparatus according to claim 1, wherein a first auxiliary antenna of the plurality of auxiliary antennas is disposed to receive radiation such that a beam formed by the first auxiliary antenna at least overlaps the first beam formed from the main antenna arrangement.

3. The interference mitigation apparatus according to claim 1, wherein each auxiliary antenna of the plurality of auxiliary antennas is a patch antenna having a patch radiator disposed in a substantially parallel relationship with a ground plane.

4. The interference mitigation apparatus according to claim 1,
wherein the main antenna arrangement is a dish antenna comprising a feed antenna and a reflector dish; and
wherein the feed antenna is disposed to receive radio frequency radiation reflected from the reflector dish, such that the first beam having a first beamwidth is formed from the reflector dish.

5. The interference mitigation apparatus according to claim 4, wherein at least one auxiliary antenna of the plurality of auxiliary antennas is disposed within the first beam formed from the reflector dish.

6. The interference mitigation apparatus according to claim 5, wherein the feed antenna is attached to the reflector dish by a support assembly, and the at least one auxiliary antenna is attached to the support assembly.

7. The interference mitigation apparatus according to claim 6, comprising a reflector plate attached to the support assembly between the feed antenna and the at least one auxiliary antenna.

8. The interference mitigation apparatus according to claim 4,
wherein the plurality of auxiliary antennas are disposed radially about an axis between a centre of the reflector dish and a centre of the feed antenna.

9. The interference mitigation apparatus according to claim 1,
wherein the main antenna arrangement is a flat plate antenna having an array of patch antenna elements and a feed network configured to combine the outputs of the patch antenna elements.

10. The interference mitigation apparatus according to claim 1, wherein:
the main antenna arrangement is configured to receive radio frequency radiation at first and second orthogonal polarisations,
at least one auxiliary antenna of the plurality of auxiliary antennas is configured to receive radio frequency radiation at third and fourth orthogonal polarisations,
wherein the first and second orthogonal polarisations are different from the third and fourth orthogonal polarisations.

11. The interference mitigation apparatus according to claim 1, wherein: each of the plurality of auxiliary antennas is configured to receive radio frequency radiation at respective orthogonal polarisations, wherein the respective orthogonal polarisations are different for each of the plurality of auxiliary antennas.

12. The interference mitigation apparatus according to claim 1, wherein the selector switch is configured to select a first respective polarisation output from one of the plurality of auxiliary antennas and to select a second respective polarisation output from the same one or a different one of the plurality of auxiliary antennas, and wherein the interference cancelling circuitry comprises a vector modulator circuit configured to weight and combine the selected polarisation outputs to produce a first weighted and combined polarisation output for connection to a polarisation input to a radio receiver.

13. The interference mitigation apparatus according to claim 12, wherein the vector modulator is configured to weight and combine the selected polarisation outputs to produce a second weighted and combined polarisation output for connection to a further polarisation input to the radio receiver.

14. A method of mitigating interference received at a terminal in a wireless network comprising:
providing a main antenna arrangement, a plurality of auxiliary antennas, a selector switch, and interference cancelling circuitry;
configuring the main antenna arrangement to receive with a pre-configured first directional radiation pattern having a first beam with a first beamwidth and to provide first received signals;
configuring each of the plurality of auxiliary antennas to receive with a pre-configured second directional radiation pattern having a second beamwidth, different from the first beamwidth, wherein each of the plurality of auxiliary antennas is disposed to form a respective beam pattern centred on a different direction from a centre of a beam pattern of each other of the plurality of auxiliary antennas;
controlling the selector switch to select at least one output from at least one of the plurality of auxiliary antennas to provide second received signals; and
controlling an amplitude and a phase of the second received signals to produce weighted second received signals and combining the weighted second received signals with the first signals received from the main antenna arrangement to reduce a level of interference signals received by the main antenna arrangement in relation to a level of wanted signals received in the main antenna arrangement.

* * * * *